United States Patent
Lee et al.

(10) Patent No.: US 7,330,656 B2
(45) Date of Patent: Feb. 12, 2008

(54) PASSIVE OPTICAL NETWORK EMPLOYING CODE DIVISION MULTIPLE ACCESS

(75) Inventors: Ki-Cheol Lee, Suwon-shi (KR); Yun-Je Oh, Yongin-shi (KR); Tae-Sung Park, Suwon-shi (KR); Jong-Kwon Kim, Taejonkwangyok-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 615 days.

(21) Appl. No.: 10/651,746

(22) Filed: Aug. 29, 2003

(65) Prior Publication Data

US 2004/0208537 A1 Oct. 21, 2004

(30) Foreign Application Priority Data

Mar. 12, 2003 (KR) ...................... 10-2003-0015397

(51) Int. Cl.
*H04J 13/00* (2006.01)

(52) U.S. Cl. ........................... 398/78; 398/58; 398/67; 398/71; 398/72; 398/74; 398/75; 398/76; 398/77

(58) Field of Classification Search .................. 398/67, 398/58, 72, 71, 74–78
See application file for complete search history.

(56) References Cited

U.S. PATENT DOCUMENTS

| | | | | |
|---|---|---|---|---|
| 6,567,579 B2* | 5/2003 | Foltzer | ......................... | 385/24 |
| 6,697,374 B1* | 2/2004 | Shraga et al. | ................ | 370/458 |
| 6,925,263 B2* | 8/2005 | Horne | ......................... | 398/154 |
| 7,164,931 B2* | 1/2007 | Ozluturk et al. | ............ | 455/522 |

FOREIGN PATENT DOCUMENTS

| | | |
|---|---|---|
| EP | 1430629 | 6/2004 |
| JP | 2001-111527 | 4/2001 |
| JP | 2001-358697 | 12/2001 |
| JP | 2002-217933 | 8/2002 |
| WO | WO 01/30004 A1 | 4/2001 |

OTHER PUBLICATIONS

Wood, Thomas; et al.; "Demonstration of a Cost-Effective, Broadband Passive Optical Network System; " IEEE Photonic Technology Letters, Piscataway, NJ; vol. 6, No. 4; Apr. 1, 1994; XP000446624.

(Continued)

*Primary Examiner*—Jason Chan
*Assistant Examiner*—Wai Lun Leung
(74) *Attorney, Agent, or Firm*—Cha & Reiter, LLC

(57) ABSTRACT

A PON and a method of transmitting data employing different upstream and downstream transmission protocols are disclosed. The PON includes: a plurality of ONTs; WDM filters; an OLT receiving and transmitting optical signals to and from the ONTs and a higher network; and an optical coupler. The ONT includes a first switching unit, a level transformer converting two level Ethernet signals into a three level data signals, a first code generator generating a specific CDMA codes that distinguish the ONT from another ONT, and a first multiplier performing a spread spectrum function with the CDMA codes. The OLT includes an optical receiver, a branching filter branching the upstream CDMA signals, a plurality of second code generators generating codes for despread, a plurality of second multipliers multiplying the received signals by the despread codes, and a plurality of data decider extracting data through correlation calculation.

10 Claims, 17 Drawing Sheets

OTHER PUBLICATIONS

Huang, Wei; et al.; "Coherent Optical CDMA (OCDMA) Systems Used for High-Capacity Optical Fiber Networks-System Description, OTDMA Comparison, and OCDMA/WDMA Networking;" Journal of Lightwave Technology; vol. 18, No. 6; Jun. 2000; XP011029724.

* cited by examiner

TIME IN SECONDS

TIME IN SECONDS

TIME IN SECONDS

TIME IN SECONDS ered as "ONTs" for the purpose of simplicity), and a passive optical coupler. The PONs are largely classified into three kinds according to their implementation methods.

PASSIVE OPTICAL NETWORK EMPLOYING CODE DIVISION MULTIPLE ACCESS

CLAIM OF PRIORITY

This application claims priority to an application entitled "Passive optical network employing code division multiple access," filed in the Korean Industrial Property Office on Mar. 12, 2003 and assigned Serial No. 2003-15397, the contents of which are hereby incorporated by reference.

BACKGROUND OF THE INVENTION

1. Field of the Invention

The present invention relates to a passive optical network (PON) for providing a large scale of data at high speed to subscribers More particularly, the present invention relates to a passive optical network that comprises an Optical Line Terminal (OLT) for providing large scale communication service of 100 Mbps or more, high speed communication service and broadcasting service to subscribers, a plurality of Optical Network Terminals (ONTs) and a passive optical branching/coupling device, and employs CDMA (Code Division Multiple Access).

2. Description of the Related Art

Recently, many services such as internet service providers (ISPs), are accessed by most internet service subscribers using one of ADSL (Asymmetric Digital Subscriber Line), cable modems, dial-up modems, Metro-Ethernet, etc., at speeds of 56 kbps to several Mbps. Also, with the increase of bandwidth required by subscribers downloading larger and larger files, it has been possible to provide data service to subscribers at about 10 Mbps by using VDSL (Very High Bit-rate Digital Subscriber Line) and so forth. However, in order to provide various services—such as a large quantity of visual information service, VoD (Video on Demand) service, high quality broadcasting service and so forth—to subscribers, transmission of data at about 100 Mbps is required, and thus it is impossible to provide the various services with only some of the technologies described above. Therefore, the necessity of construction of optical subscriber networks using optical communication is rapidly increasing, so that a PON (Passive Optical Network) has been suggested and is being developed as a method capable of most economically forming an optical subscriber network.

The PON comprises at least one OLT (Optical Line Terminal), a plurality of ONUs (Optical Network Units) or ONTs (Optical Network Terminals) (hereinafter, designated as "ONTs" for the purpose of simplicity), and a passive optical coupler. The PONs are largely classified into three kinds according to their implementation methods.

FIG. 1A shows a schematic view of an ATM-PON employing an ATM (Asynchronous Transfer Mode) according to the prior art, FIG. 1B shows a schematic view of an Ethernet PON employing an Ethernet mode according to the prior art, and FIG. 1C shows a schematic view of a WDM-PON employing a WDM (Wavelength Division Multiplex) according to the prior art. Also, FIG. 1D shows a schematic view of an optical subscriber network employing CDMA (Code Division Multiple Access) technology.

One of the three kinds of PONs is the ATM-PON shown in FIG. 1A, in which ATM cells are transmitted at 155 Mbps and with a wavelength of 1310 nm for upstream communication and data are transmitted at 155/622 Mbps and with a wavelength of 1550 nm in cell unit for downstream communication. A second of the three kinds of PONs, which is an Ethernet PON shown in FIG. 1B, has the upstream and downstream wavelength same as the ATM-PON, while using Gigabit Ethernet signals at 1.25 Gbps for both upstream and downstream signals. The ATM PON uses cells of fixed length, while the Ethernet PON uses Ethernet frames of variable length. A third of the three kinds of PONs is a WDM-PON which assigns transmitting and receiving wavelengths to each ONT individually. Therefore, the WDM-PON, as shown in FIG. 1C, uses wavelength multiplexer/demultiplexers not a passive optical coupler, unlike the ATM-PON and the Ethernet PON.

In addition, another method is shown in FIG. 1D in which an optical subscriber network employs CDMA (Code Division Multiple Access) technology. This method employs CDMA (Code Division Multiple Access) technology for both upstream and downstream communications. Herein also, upstream and downstream data according to this method are transmitted at about 10 Mbps.

The ATM-PON and the Ethernet PON of the prior art use TDM (Time Division Multiplexing) technology for downstream communication and TDMA (Time Division Multiple Access) technology for upstream communication in order to transmit data. Then, in the case of the downstream signals, data are transmitted in a broadcasting method, resulting in a problem of signal collision. However, in the case of the upstream signals, the same wavelength is used when two or more ONTs simultaneously transmits their signals to an OLT, so that signal collision may be caused in the passive optical coupler. Therefore, the ATM-PON and the Ethernet PON have to use a very complicated Media Access Control (MAC) protocol in order to solve this problem. Also, since distances between the OLT and each ONT are different from each other, various optical signals of different strengths are inputted into an optical receiver in the OLT, so that a Burst Mode IC (BMIC) is necessarily required so as to receive the various optical signals in stabilization. An optical transmitter in the ONT needs a BMIC to operate the transmitter only in a case in which signals to transmit exist, and it is largely restricted for the ATM PON and the Ethernet PON to receive a guaranteed bandwidth because the PONs use MAC (Media Access Control) and so forth.

In the case of the WDM-PON, since the MAC is not used, operation of the PON system is simple and a broad bandwidth can be efficiently guaranteed, however, it is difficult to product optical transmitter/receiver modules in a low cost, so that continuous studies and development have been made on a low cost of optical transmitter/receiver modules.

Meanwhile, in the case of an optical subscriber network employing CDMA, because CDMA is applied to upstream communication, it has an advantage in that the use of MAC is not required. However, the CDMA technology is also applied to downstream communication in the optical subscriber network in spite of the fact that the downstream communication adopting broadcasting method doesn't need MAC, so that the construction of the ONT and the OLT is complicated, thereby increasing the cost. Also, in the conventional optical network employing CDMA, data must be divided according to each subscriber by an switch in the OLT before transmission of the data, thereby complicating the operation of the OLT.

SUMMARY OF THE INVENTION

Accordingly, the present invention has been made to overcome the above-mentioned problems and provides additional advantages, by providing a PON (Passive Optical Network) using TDM technology like the Ethernet PON for downstream signals so as to provide a large quantity of data at a high speed to subscribers, while using CDMA technology, not TDMA technology like the prior art, for upstream signals being transmitted from ONTs to an OLT, thereby not requiring the use of the complicated MAC.

The present invention also provides a PON in which the optical transmitter/receiver commercially used in the prior art can be used without a Burst Mode IC (BMIC) for an optical receiver of an OLT and optical transmitters of ONTs.

Additionally, the present invention provides a PON capable of guaranteeing bandwidth at all times by enabling data to be transmitted to an OLT whenever each ONT has data to be transmitted.

The present invention also provides a PON capable of solving a security problem identified as a problem in the PON by enabling upstream transmission signals to be easily encoded by the use of the CDMA.

The present invention also provides a PON having simpler constructions of OLTs and ONTs than the conventional optical subscriber networks employing CDMA according to the prior art.

In order to accomplish these objects, there is provided a PON (Passive Optical Network) employing CDMA (Code Division Multiple Access) comprising: a plurality of ONTs (Optical Network Terminals) corresponding to subscribers; WDM filters for dividing upstream and downstream wavelengths; an OLT (Optical Line Terminal) for receiving optical signals transmitted from the ONTs and transmitting the received optical signals to a higher network, the OLT transmitting signals transmitted from the higher network into ONTs; and an optical coupler, wherein: each ONT includes a first switching means connected to at least one lower interface, such as computers, a level transformer for converting Ethernet signals having levels of '0' and '1' into data signals of levels of '−1' and '+1', a first code generator for generating CDMA codes as specific codes so as to discriminate each ONT, and a first multiplier for performing spread spectrum function by multiplying the data signals by the CDMA codes, thereby transmitting Ethernet signals transmitted from the lower interfaces into the higher network; and the OLT includes an optical receiver for receiving optical signals transmitted from the ONTs, a branching filter for branching upstream CDMA signals received through the optical receiver, a plurality of second code generators for generating codes for despread, a plurality of second multipliers for multiplying received signals by the codes generated from the second code generators, and a plurality of data decider for extracting data through correlation calculation, thereby transmitting Ethernet signals transmitted from higher interfaces into the higher network.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Hereinafter, a PON (Passive Optical Network) employing CDMA (Code Division Multiple Access) according to preferred aspects of the present invention will be described with reference to the accompanying drawings. For the purposes of clarity and simplicity, a detailed description of known functions and configurations incorporated herein will be omitted as it may make the subject matter of the present invention unclear.

Figure 1A:
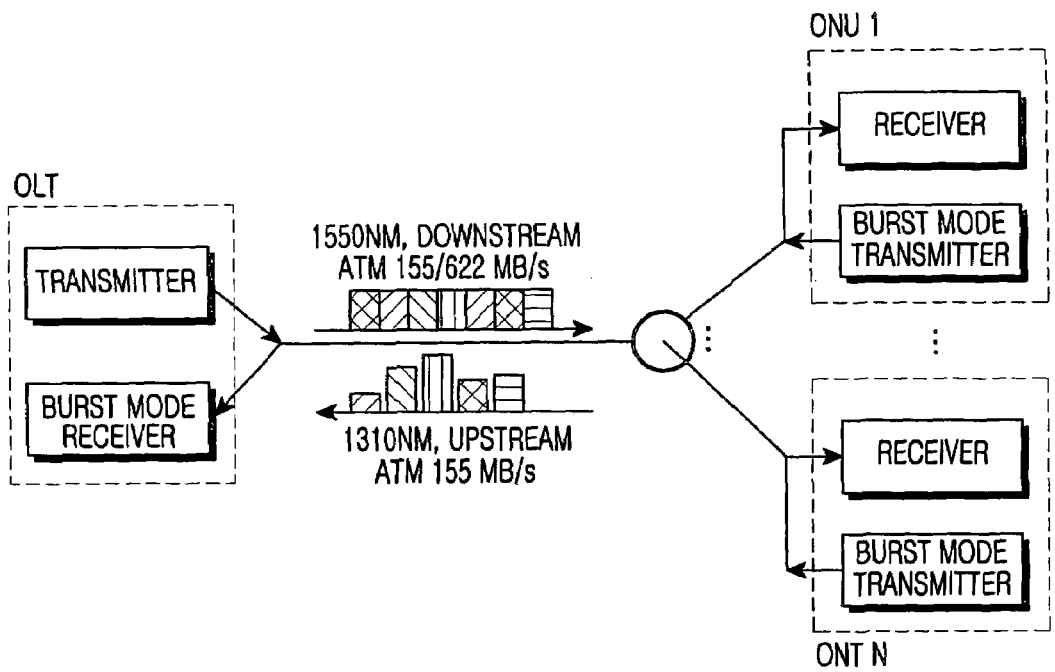
FIG. 1A is a schematic view of an ATM-PON employing an ATM according to the prior art.
Figure 1B:
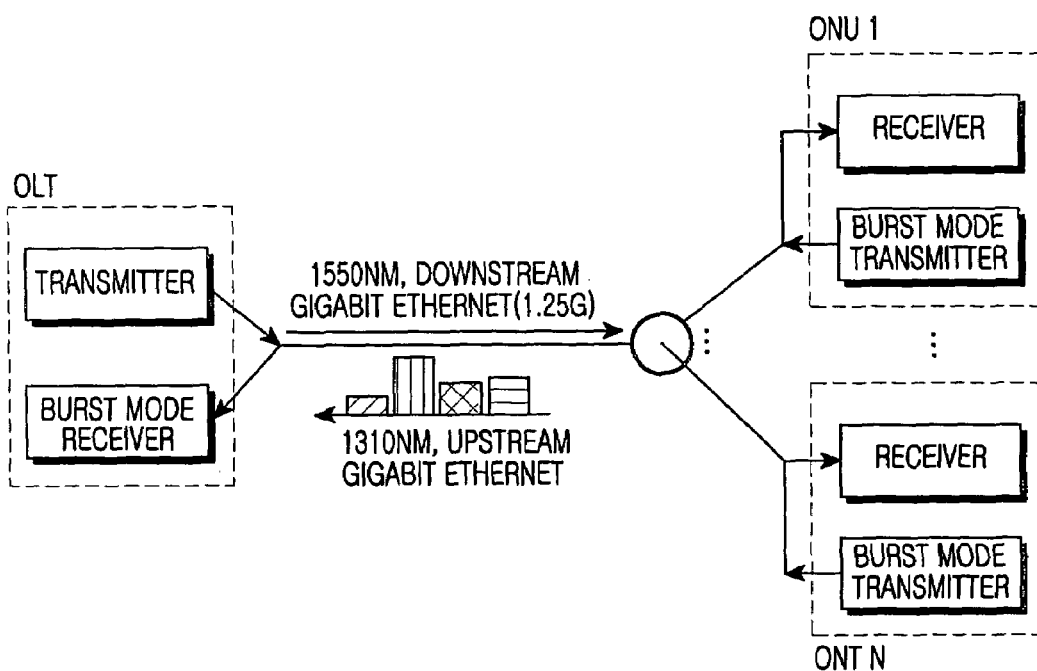
FIG. 1b is a schematic view of an Ethernet PON employing an Ethernet mode according to the prior art.
Figure 1C:
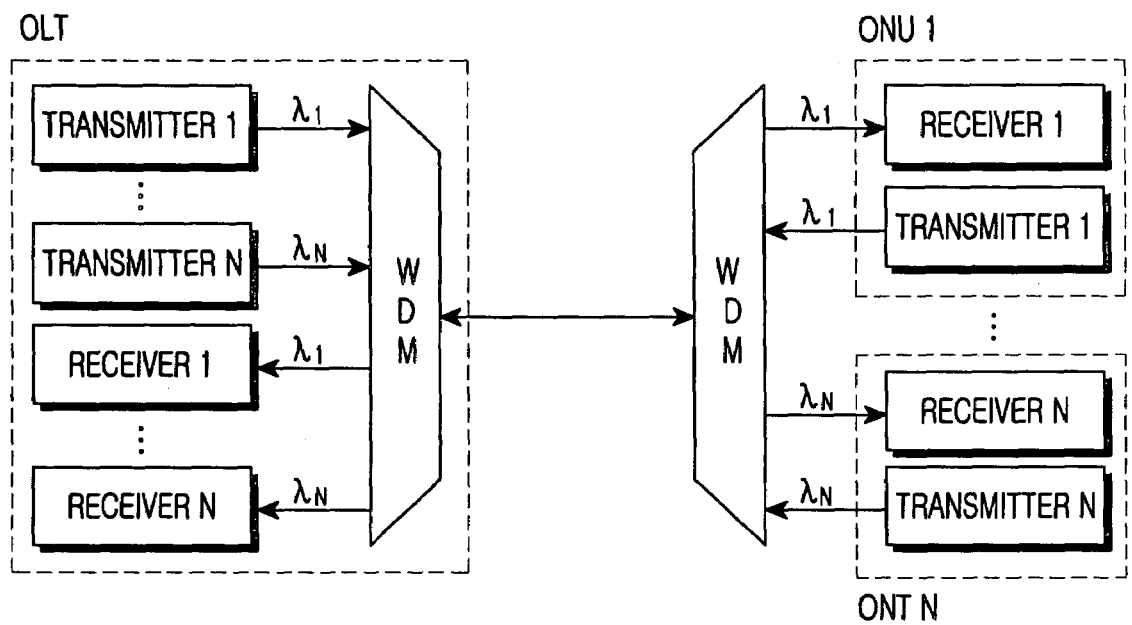
FIG. 1c is a schematic view of a WDM-PON employing a WDM according to the prior art.
Figure 1D:
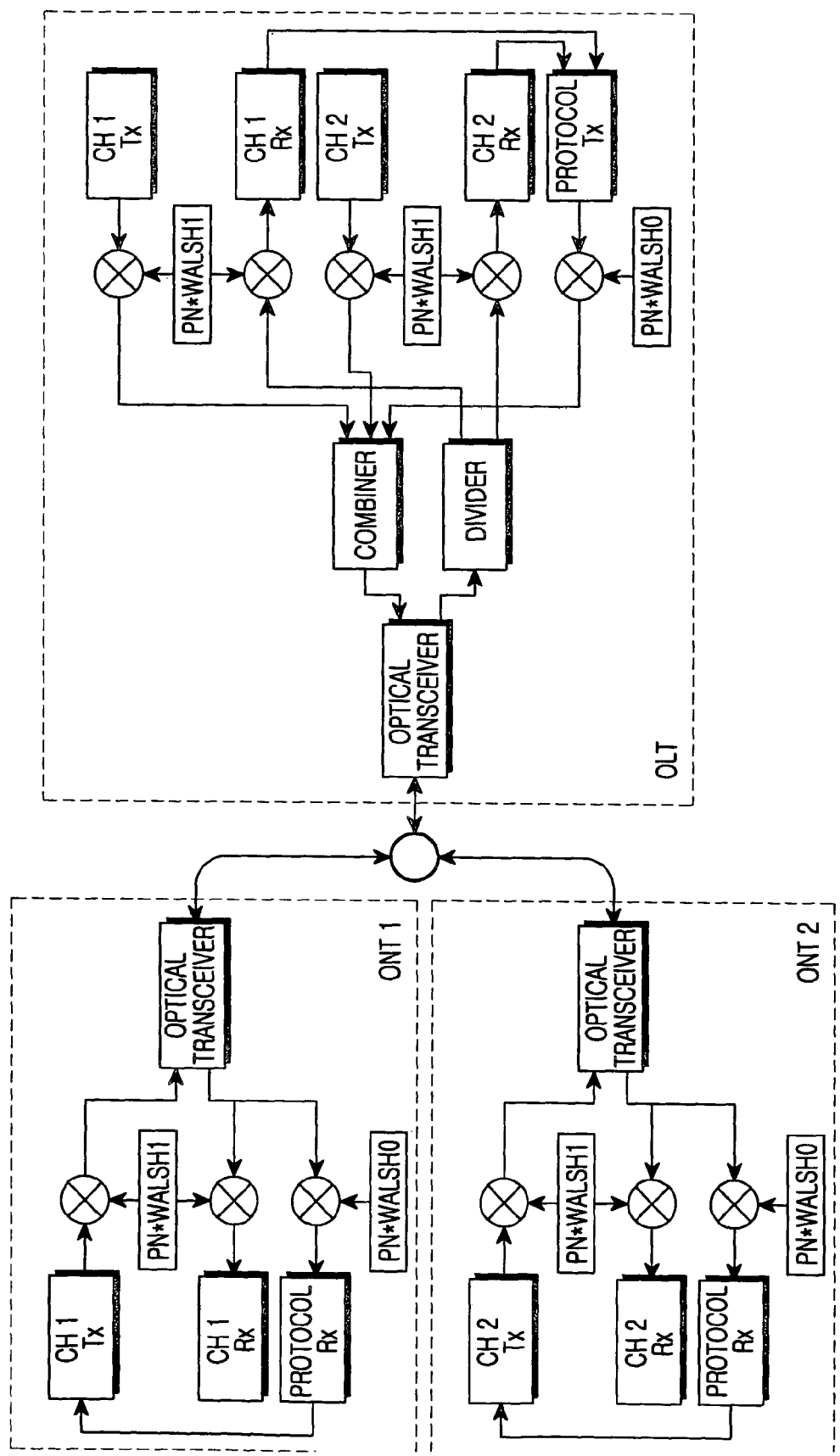
FIG. 1d is a schematic view of an optical subscriber network employing CDMA technology.
Figure 2:
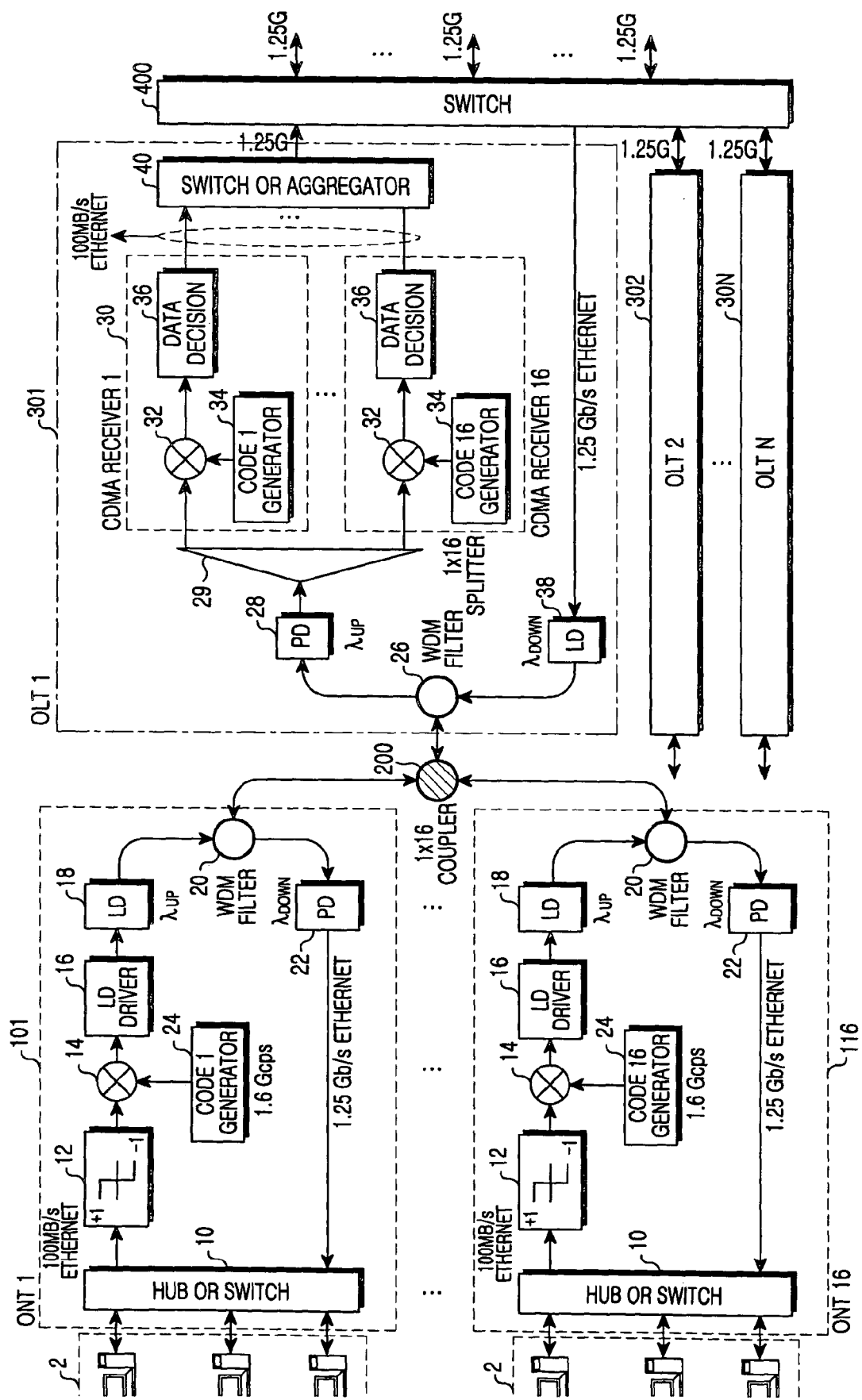
FIG. 2 is a schematic view illustrating a PON employing CDMA according to the present invention.

FIG. 2 is a schematic view illustrating a PON employing CDMA according to the present invention.

Referring to FIG. 2, a PON employing CDMA according to the present invention comprises sixteen ONTs (Optical Network Terminals) 101 to 116 corresponding to the number of subscribers, a plurality of OLTs (Optical Line Terminals)

301 to 30N which transmit optical signals received from the ONTs 101 to 116 into a higher network and transmit signals received from the higher network into the ONTs 101 to 116, and an optical coupler 200.

Each of the ONTs 101 to 116 includes a first switching unit 10, a level transformer 12, a code generator 24, a multiplier 14, a laser driver 16, a laser diode 18, an optical receiver (photo diode) 22, and a WDM (Wavelength Division Multiplexing) filter 20. The first switching unit 10 may comprise a hub or any other switching device, is connected to lower interface 2, such as computers. The level transformer 12 transforms 100 Mbps Ethernet signals having levels of '0' and '1' into those having levels of '−1' and '+1'. The code generator 24 generates CDMA codes of 1.6 Gcps (chips per second) assigned to each of the ONTs 101 to 116. The multiplier 14 multiplies data signals by the CDMA codes for spread spectrum. The laser driver 16 is a device for controlling laser drive current. The laser diode 18 modulates electric signals into optical signals. The optical receiver 22 receives 1.25 Gbps Ethernet signals transmitted from the OLTs. The WDM filter 20 is a device for dividing upstream wavelengths and downstream wavelengths.

Each of the OLTs 301 to 30N comprises a WDM filter 26, an optical receiver 28, a 1×16 branching filter 29, at least one code generator 34, at least one multiplier 32, at least one data decider 36, a second switching unit 40, and an optical transmitter 38. The WDM filter 26 divides upstream wavelengths and downstream wavelengths. The optical receiver 28 receives optical signals transmitted from the ONTs 101 to 116. The 1×16 branching filter 29 branches received upstream CDMA signals. Each code generator 34 is a device for despreading. Each multiplier 32 multiplies received signals by code. The data decider 36 extracts data through correlation calculation. The second switching unit 40 may comprise that of an aggregator or any other switch device, and converts 100 Mbps Ethernet signals into 1.25 Gbps Ethernet signals. The optical transmitter 38 is a device for transmitting 1.25 Gbps Ethernet signals to downstream. Also, each of the OLTs 301 to 30N is connected to an upper network through a third switching unit 400 having 1.25 Gbps Ethernet interface.

The operation of the PON employing CDMA of FIG. 2 will be explained. Data transmitted from the lower interface 2, such as computers, are subjected to a switching process or an aggregation process in the first switching unit 10, and then are inputted to the level transformer 12 in the form of 100 Mbps Ethernet signals. The level transformer 12 transforms data signals having levels of '0' and '1' into those having levels of '−1' and '+1'. The code generator 24, which generates codes of 1.6 Gcps for pertinent ONT 101 to 116, generates specific codes for discriminating pertinent subscriber among the whole subscribers. For example, in the case that 16-chip Walsh Hadamard codes are used, '1111111111111111' of code-1 is assigned to a first ONT 101 and '1-1-11-111-1-111-11-1-11' of code-16 is assigned to a sixteenth ONT 116. The codes represented above are repetitively assigned to each data bit, so that the code generator 24 for 1.6 Gcps Ethernet must be used so as to endow 100 Mbps Ethernet signals with a 16-chip sequence. The Walsh Hadamard codes, which are used as CDMA codes in the present invention, may be replaced by code.

Data signals outputted from the level transformer 12 are multiplied by the code generated from the code generator 24 in the multiplier 14, thereby being spread spectrum. The spread-spectrum signals are converted to laser-driving levels in the laser driver 16, are optical-modulated in the laser diode 18 having an upstream wavelength $\lambda_{UP}$, and then are transmitted to the OLT 301 through the WDM filter 20. Also, 1.25 Gbps Ethernet signals of a downstream wavelength $\lambda_{DOWN}$ transmitted from the OLT 301 are converted to electric signals at the optical receiver 22 in each of the ONTs 101 to 116 after passing the WDM filter 20, and then are transmitted to the lower interface 2, such as computers, through the first switching means 10.

Optical signals of $\lambda_{UP}$ transmitted from each of the ONTs 101 to 116 are connected with each other in the 1×16 optical coupler 200, and then are transmitted to the OLT 301. The optical signals transmitted through the 1×16 optical coupler 200 are divided by the WDM filter 26 so as to be transferred to the optical receiver 28, and then are converted into electric signals in the optical receiver 28. The electric signals are branched into sixteen signals through the 1×16 branching filter 29, and then each of the branched electric signals is respectively inputted to each corresponded CDMA receiver 30 in which each CDMA receiver 30 comprises a code generator 34, a multiplier 32 and a data decider 36. In each CDMA receiver 30, the code generator 34 synchronized with the ONTs 101 to 116 generates codes—for example, CDMA codes having a first code to a sixteenth code—so as to decode data transmitted from each ONT, and the codes are multiplied with received signals in the multiplier 32.

The multiplied signals are subjected to a process, such as correlation calculation, in the data decider 36, thereby decoding 100 Mbps Ethernet signals transmitted from each of the ONTs 101 to 116. The decoded 100 Mbps Ethernet signals are converted into 1.25 Gbps Ethernet signals in the second switching unit 40, and then are transmitted to other OLTs 302 to 30N or a upper network through the switch 400 which are connected to the OLTs 301 to 30N.

In accordance with the process of the present invention described above, it can be seen that the complicated MAC (Media Access Control) isn't required when each of the ONTs 101 to 116 transmits upstream data to the OLT 301 to 30N and furthermore a BMIC (Burst Mode IC) isn't required in receiving optical signals in each of the OLTs 301 to 30N. Also, a BMIC for the optical receiver in each of the ONTs 101 to 116 isn't needed since an optical transmitter in each of the ONTs 101 to 116 is always kept in a 'switched-on' state so that the CDMA receiver decodes received data. The 1.25 Gbps Ethernet signals, which are transmitted from other OLTs 302 to 30N or a upper network through the switch 400, are optical-modulated at the optical transmitter 38 in the OLT 301, pass through the WDM filter 26, and then are branched through the 1×16 optical coupler 200 so as to be transmitted to the ONTs 101 to 116.

Figure 3:
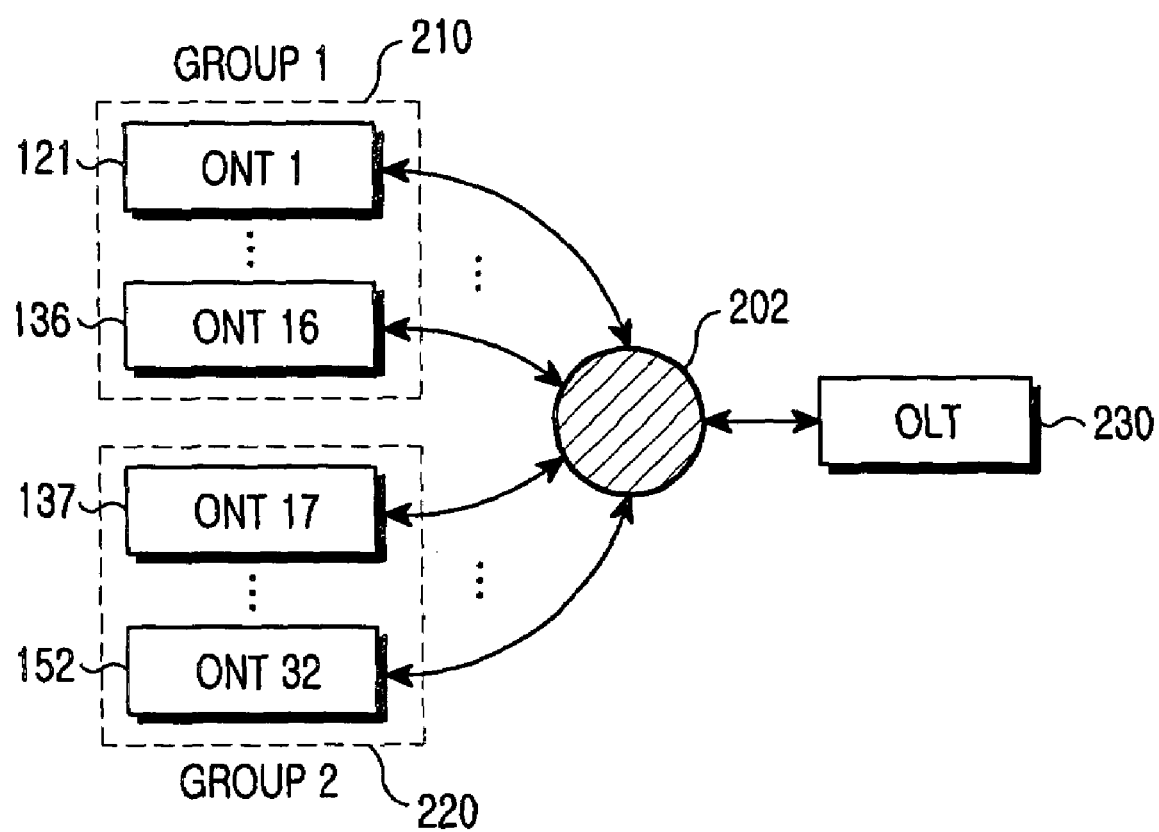
FIG. 3 is a schematic view illustrating a CDMA-employing PON for accommodating 32 number of ONTs according to a first aspect of the present invention.
Figure 4:
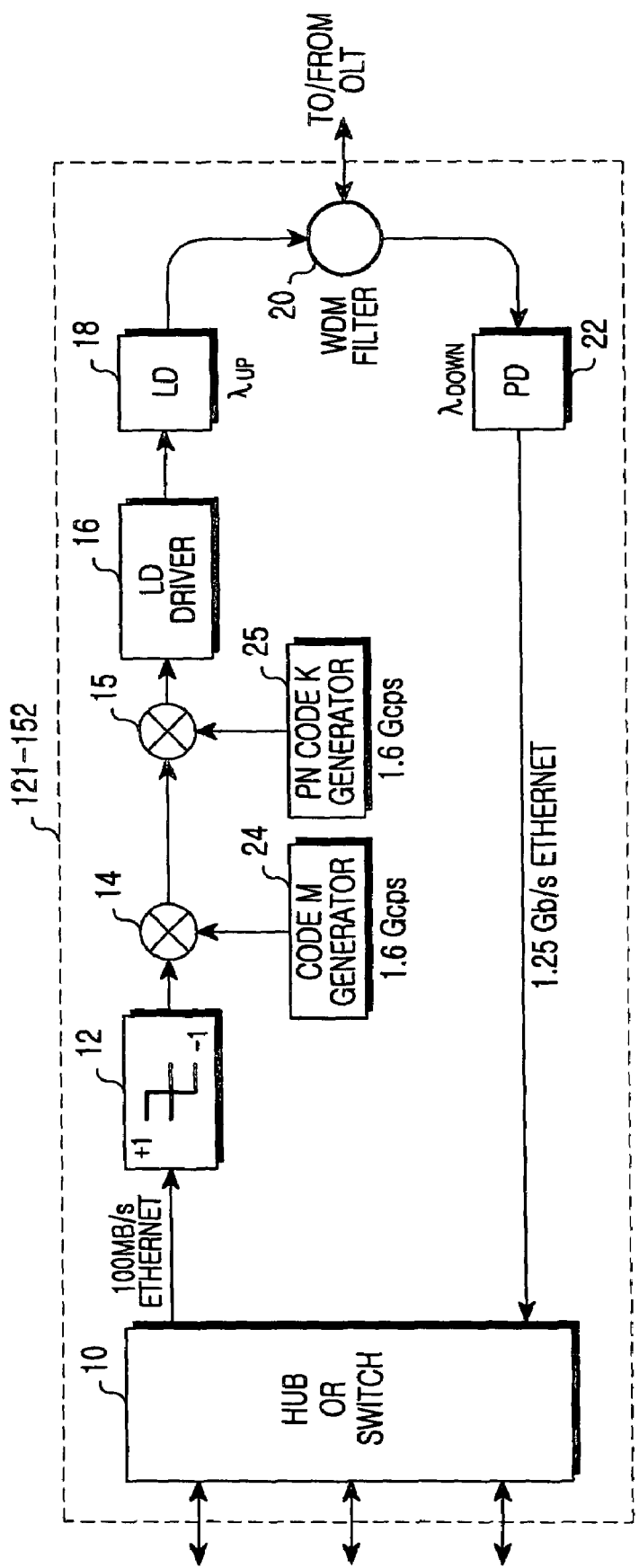
FIG. 4 is a schematic view illustrating a construction of an ONT in the CDMA-employing PON according to the first aspect shown in FIG. 3.
Figure 5:
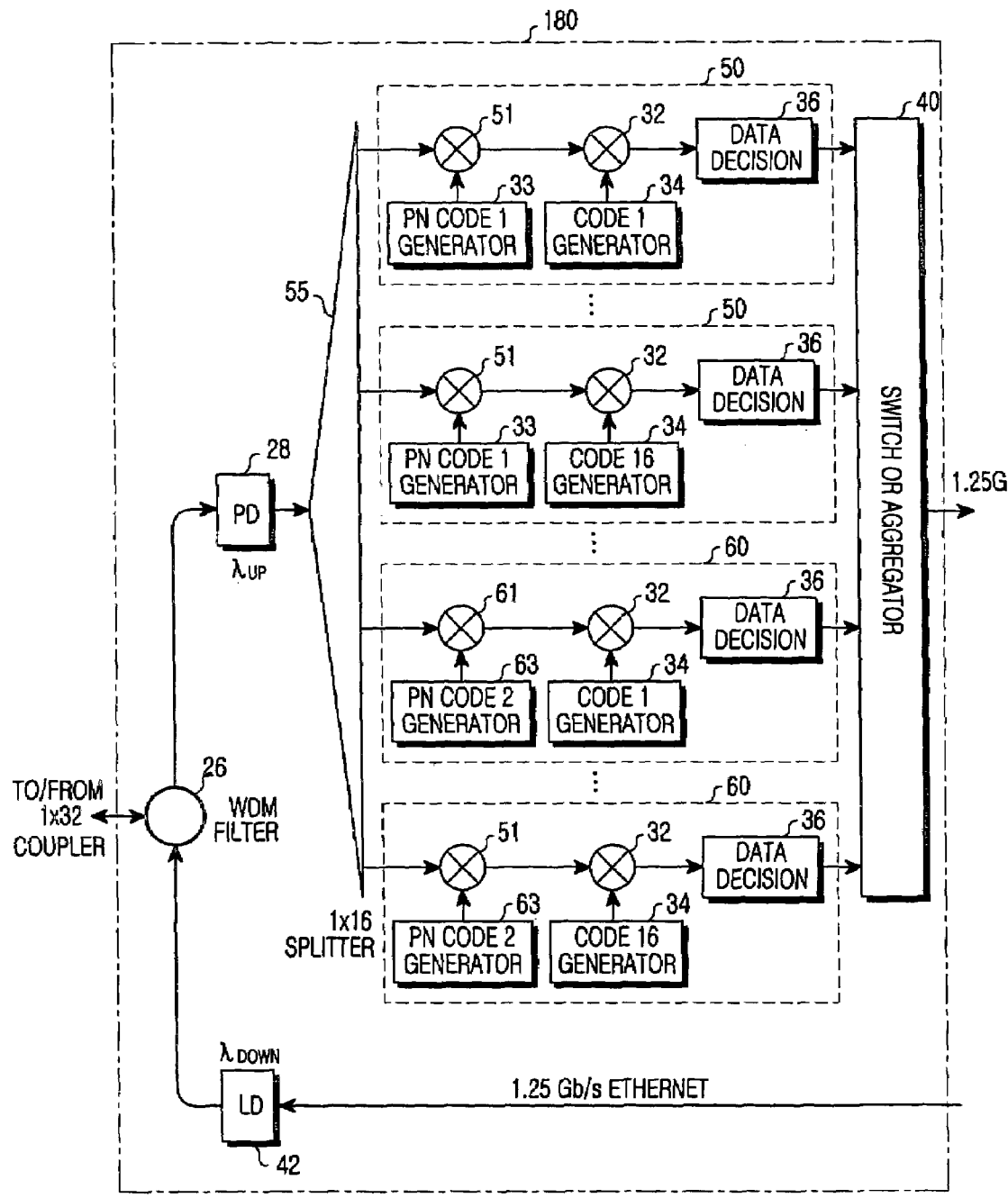
FIG. 5 is a schematic view illustrating a construction of an OLT in the CDMA-employing PON according to the first aspect shown in FIG. 3.

FIG. 3 is a schematic view illustrating a CDMA-employing PON for accommodating 32 number of ONTs according to a first aspect of the present invention, FIG. 4 is a schematic view illustrating a construction of an ONT in the CDMA-employing PON according to the first embodiment shown in FIG. 3, and FIG. 5 is a schematic view illustrating a construction of an OLT in the CDMA-employing PON according to the first aspect shown in FIG. 3.

Referring to FIG. 3 to FIG. 5, a CDMA-employing PON, which accommodates 32 number of ONTs according to a first aspect of the present invention, comprises 32 number of ONTs 121 to 152, an OLT 230 and a 1×32 optical coupler 202. The ONTs are classified into two groups 210 and 220 so that each group includes sixteen ONTs. In this method, each of the ONTs 121 to 152 has the same construction as the ONT shown in FIG. 2 except that a PN (Pseudo-random Noise) code generator 25 and a multiplier 15 is included additionally. The OLT 230 additionally includes a 1×32 branching filter 55, and a PN code generator 53 and a multiplier 51 for despreading PN codes.

The operation principle of the PON for accommodating 32 number of subscribers according to the first aspect of the present invention will be explained with reference to FIG. 3 to FIG. 5. In this method, 32 number of ONTs 121 to 152 are classified into two groups 210 and 220 so that each group includes sixteen ONTs. Each of the ONTs 121 to 152 is discriminated by using 16-chip-sequence CDMA codes as shown in FIG. 3. Also, each group is discriminated by PN codes without regard to the discrimination for each ONT. That is, a first group 210 is discriminated with a first PN code, and a second group 220 is discriminated with a second PN code. Therefore, each of the ONTs 121 to 152 comprises a PN code generator 25 for discriminating its group besides the 16-chip-sequence code generator, and performs a spread spectrum function through a multiplier 15. Signals generated from each of the ONTs 121 to 152 are connected in the 1×32 optical coupler 202, and then are transmitted to the OLT 230. The signals received in the OLT 230 are divided into 32 number of signals through the 1×32 branching filter 55. First to sixteenth signals of the divided signals are multiplied in the multiplier 51 with a first PN code generated from a first PN code generator 53 so as to encode signals transmitted from the ONTs 121 to 136 of the first group 210. Seventeenth to thirty-second signals of the divided signals are multiplied in the multiplier 61 with a second PN code generated from a second PN code generator 63 so as to encode signals transmitted from the ONTs 137 to 152 of the second group 220. The signals, which are divided according to groups through the processes described above, are subjected to the process with codes generated from the 16-chip-sequence code generator as shown in FIG. 2, and thus 100 Mbps Ethernet data transmitted from each of the ONTs 121 to 152 are decoded. When the method described above, that is, the method of additionally multiplying the PN codes, is applied to the construction shown in FIG. 2, it is possible to encode signals to be transmitted, so that a problem of security can be solved.

Figure 6:
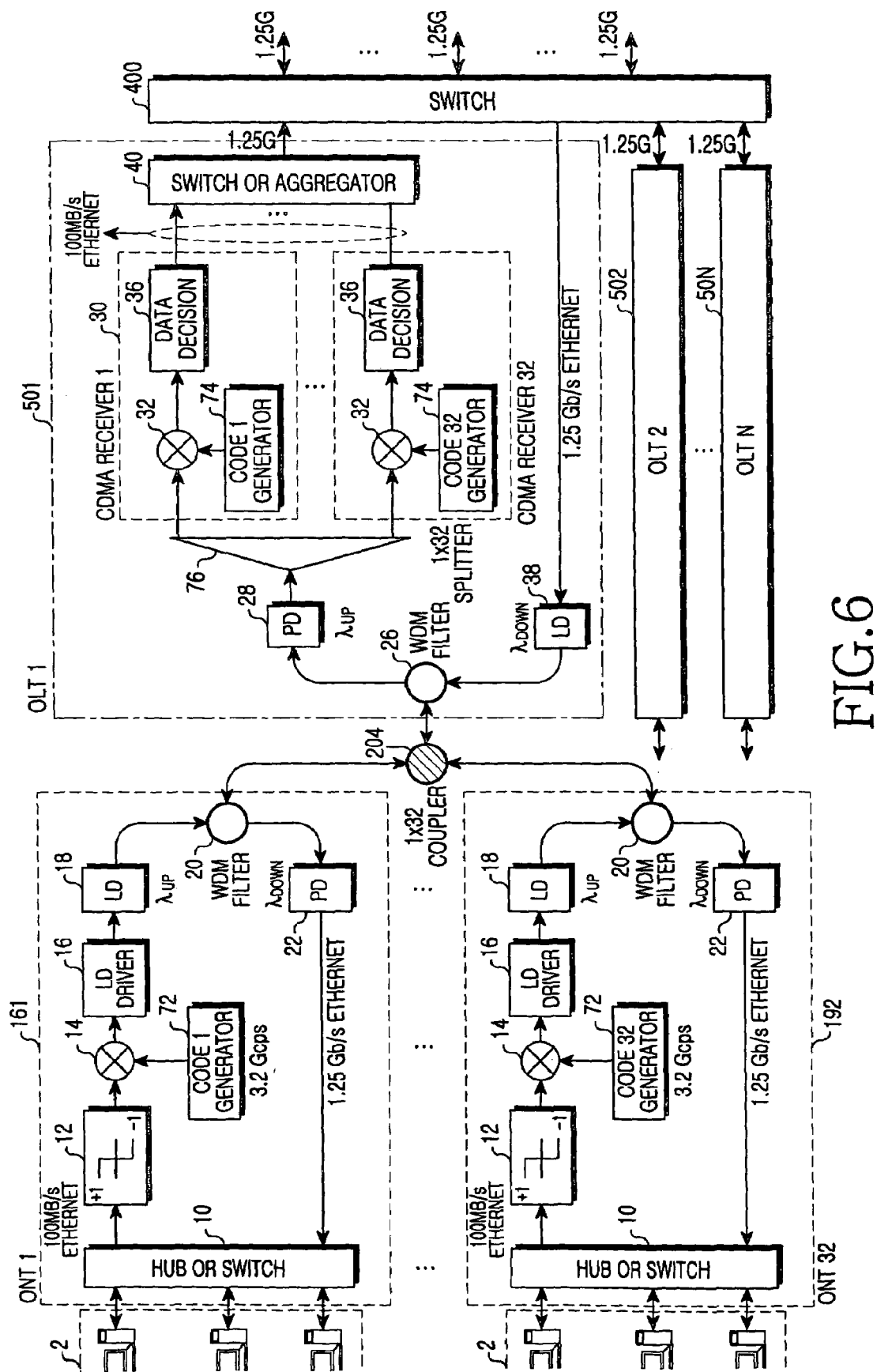
FIG. 6 is a schematic view illustrating a CDMA-employing PON for accommodating 32 number of ONTs according to a second aspect of the present invention.

FIG. 6 is a schematic view illustrating a CDMA-employing PON for accommodating 32 number of ONTs according to a second aspect of the present invention.

FIG. 6, which illustrates a PON for accommodating 32 number of ONTs according to the second aspect, comprises 32 number of ONTs 161 to 192, a 1×32 optical coupler 204 and a plurality of OLTs 501 to 50N. Each of the ONTs 161 to 193. Each of the OLTs 501 to 50N have the same construction as the ONT 101 to 116 and the OLT 301 to 30N shown in FIG. 2 respectively except that a 3.2-Gcps code generator 72 or 74 is included. Also, a 1×32 branching filter 76 is required in each of the OLTs 501 to 50N.

The operation principle of the CDMA-employing PON for accommodating 32 number of subscribers according to the second aspect of the present invention is almost similar to the CDMA-employing PON shown in FIG. 2, and has only a little difference. The construction of FIG. 2 includes CDMA code generators having 16-chip sequence so as to accommodate sixteen subscribers, while the construction of FIG. 4 includes 3.2-Gcps CDMA code generators 72 for generating a 32-chip sequence so as to accommodate 32 number of subscribers. Signals transmitted from each ONT are coupled in the 1×32 optical coupler 204, and then are converted into electric signals by an optical receiver 28 in each of the OLTs 501 to 50N. The electric signals are divided into 32 number of signals by the 1×32 branching filter 76, and then are encoded to original 100 Mbps Ethernet data in 32 number of CDMA receivers in which each CDMA receiver has a code generator so as to generate each of the CDMA codes.

Figure 7:
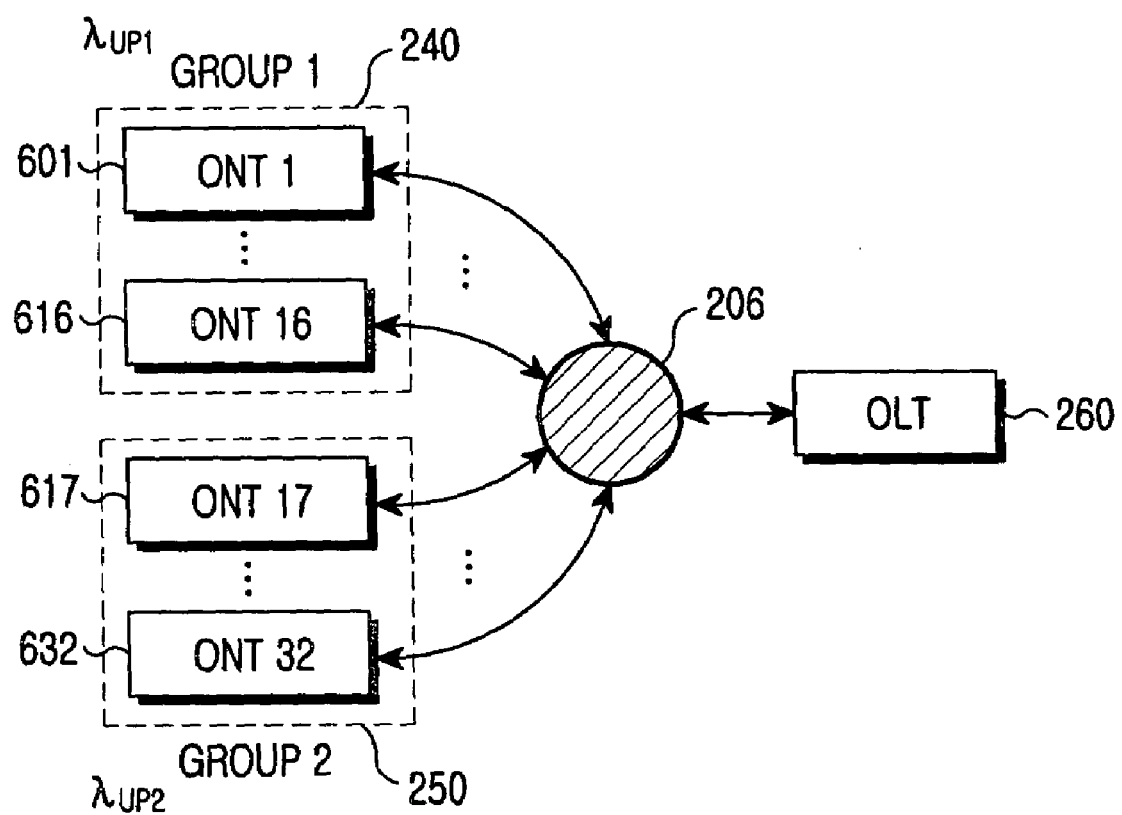
FIG. 7 is a schematic view illustrating a CDMA-employing PON for accommodating 32 number of ONTs according to a third aspect of the present invention.

FIG. 7 is a schematic view illustrating a CDMA-employing PON for accommodating 32 number of ONTs according to a third aspect of the present invention.

Figure 8:
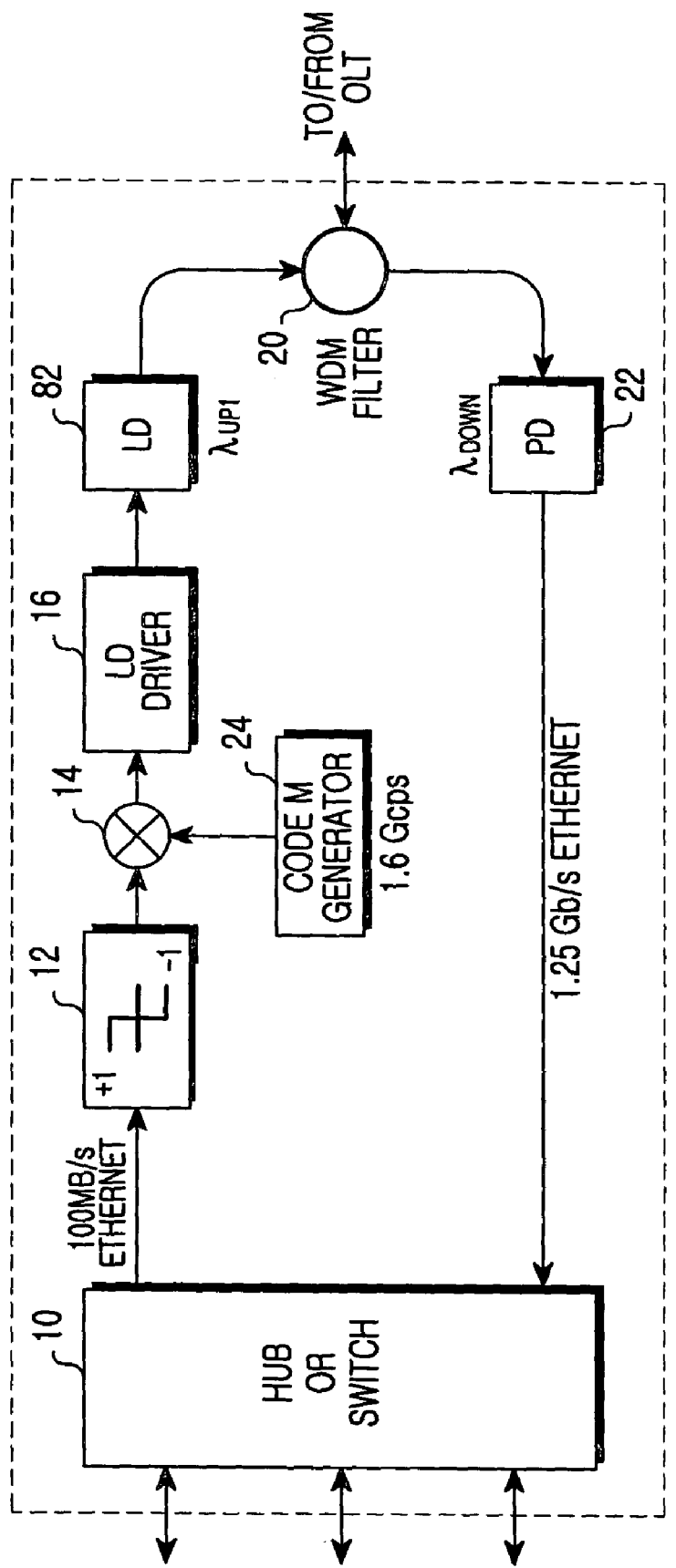
FIG. 8 is a schematic view illustrating a construction of an ONT in a first group of ONTs of the CDMA-employing PON for accommodating 32 number of ONTs according to the third aspect of the present invention.

FIG. 8 is a schematic view illustrating a construction of an ONT in a first group of ONTs of the CDMA-employing PON for accommodating 32 number of ONTs according to the third aspect of the present invention.

Figure 9:
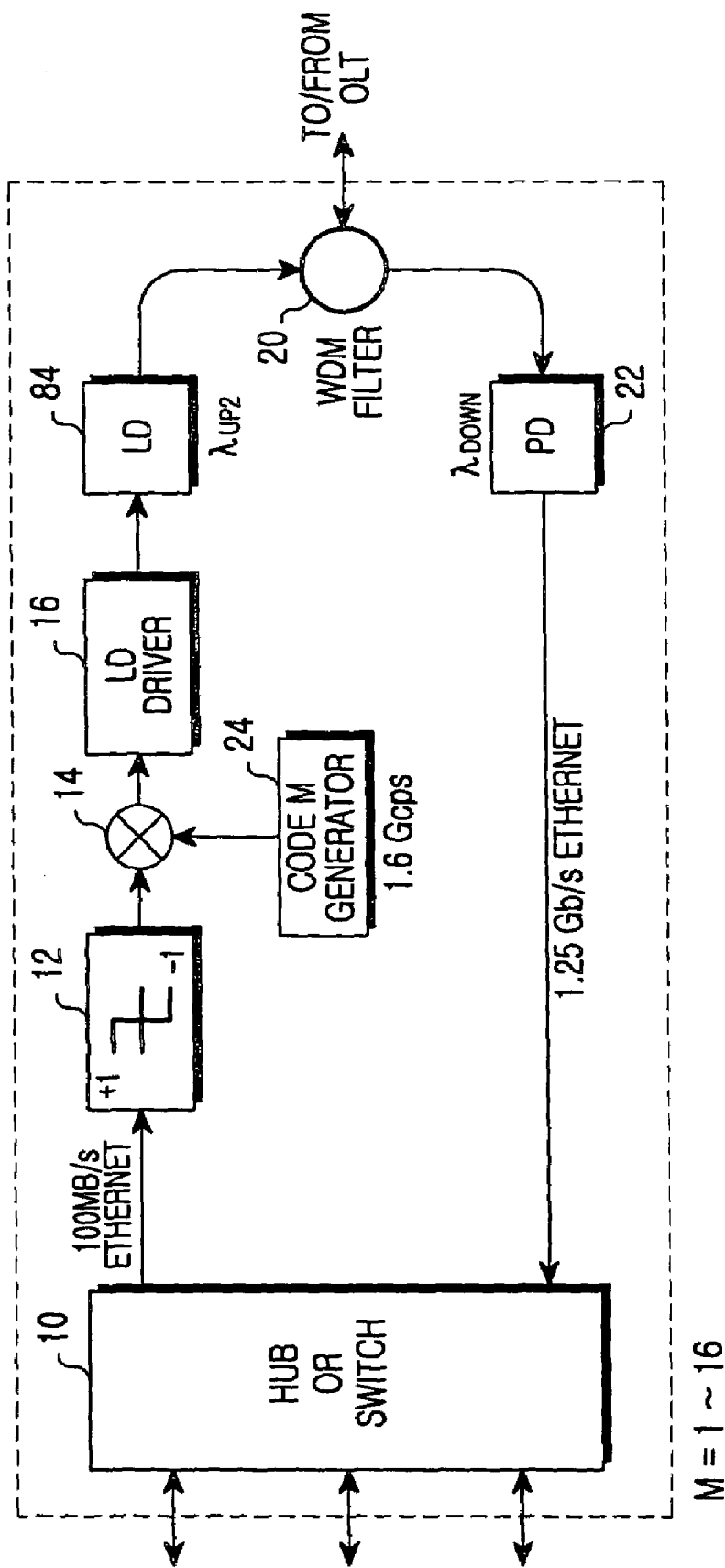
FIG. 9 is a schematic view illustrating a construction of an ONT in a second group of ONTs of the CDMA-employing PON for accommodating 32 number of ONTs according to the third aspect of the present invention.

FIG. 9 is a schematic view illustrating a construction of an ONT in a second group of ONTs of the CDMA-employing PON for accommodating 32 number of ONTs according to the third aspect of the present invention.

Figure 10:
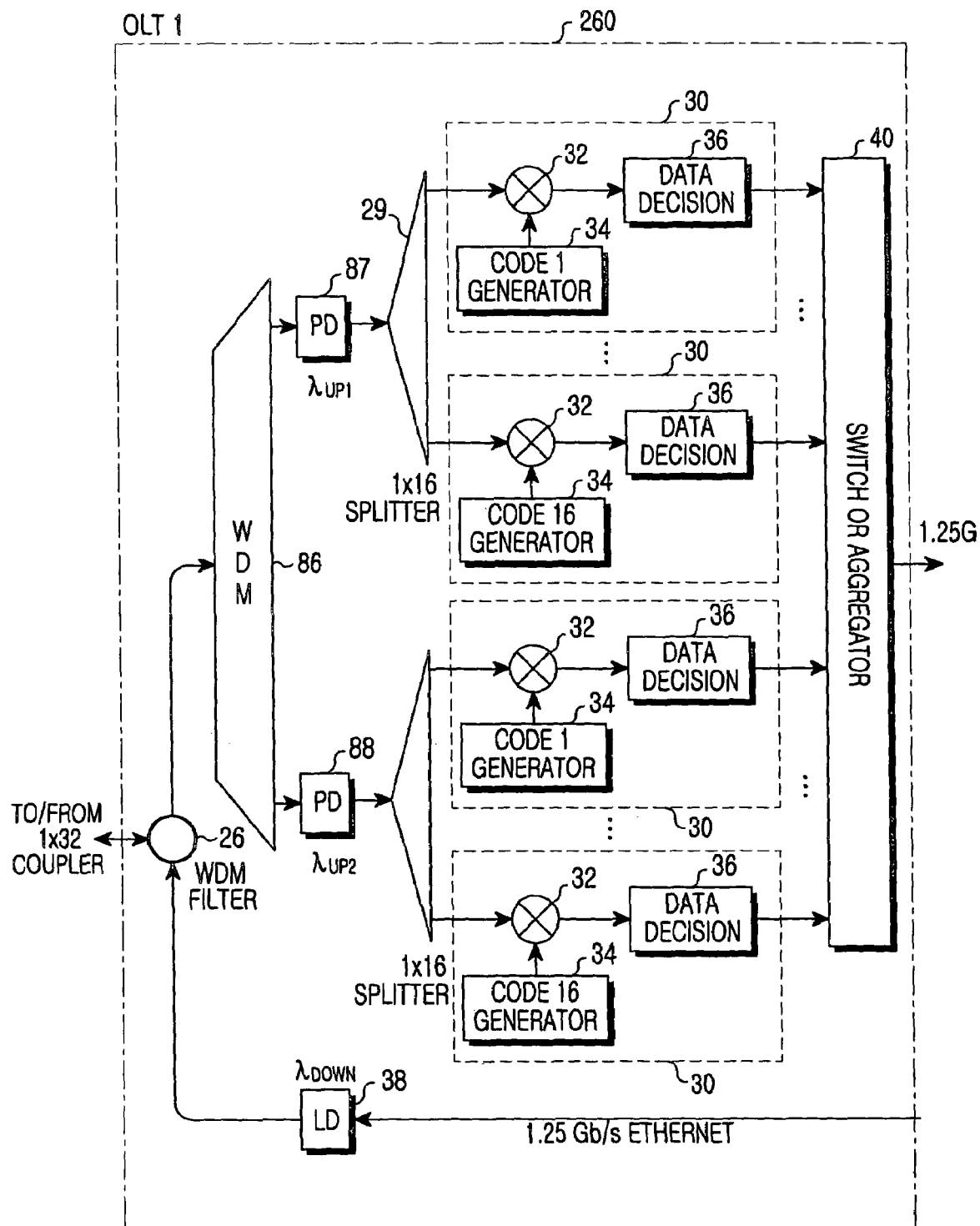
FIG. 10 is a schematic view illustrating a construction of an OLT in the CDMA-employing PON for accommodating 32 number of ONTs according to the third aspect of the present invention.

Also, FIG. 10 is a schematic view illustrating a construction of an OLT in the CDMA-employing PON for accommodating 32 number of ONTs according to the third aspect of the present invention.

Referring to FIGS. 7 to 10, a CDMA-employing PON, which accommodates 32 number of ONTs according to a third aspect of the present invention, comprises 32 number of ONTs 601 to 632, an OLT 260 and a 1×32 optical coupler 206. The ONTs are classified into two groups 240 and 250 including sixteen ONTs respectively, and use different upstream-transmission wavelengths from each other, according to groups. That is, each ONT of a first group 240 uses a laser diode 82 having an upstream wavelength $\lambda_{UP1}$, and each ONT of a second group 250 uses a laser diode 84 having an upstream wavelength $\lambda_{UP2}$. Also, the OLT 260 includes a wavelength-demultiplexing filter 86 for dividing wavelengths transmitted from each group, two optical receivers 87 and 88.

As shown in FIGS. 7 to 10, in the third aspect of the present invention, sixteen ONTs 601 to 632, like those of the first aspect, is divided into two groups 240 and 250 each including sixteen ONTs. The ONTs 601 to 632 in each group use 16-chip-sequence CDMA codes like those of the first aspect. The ONTs 601 to 632 in this aspect use different upstream-transmission wavelengths according to groups so as to distinguish each group. That is, each ONT of a first group 240 uses an upstream wavelength $\lambda_{UP1}$, and each ONT of a second group 250 uses an upstream wavelength $\lambda_{UP2}$. Therefore, each of the ONTs 601 to 616 of a first group 240 uses a laser diode 82 having an upstream wavelength $\lambda_{UP1}$ and each of the ONTs 617 to 632 of a second group 250 uses a laser diode 84 having an upstream wavelength $\lambda_{UP2}$. Signals transmitted from each of the ONTs 601 to 632 are coupled in the 1×32 optical coupler 206, and then are divided in the wavelength-demultiplexing filter 86 in the OLT 260 according to wavelengths. The optical signals divided according to wavelengths $\lambda_{UP1}$ and $\lambda_{UP2}$ are converted into electric signals by the optical receivers 87 and 88, and then are encoded to original 100 Mbps Ethernet data in the same CDMA receivers as those shown in FIG. 2.

Figure 11:
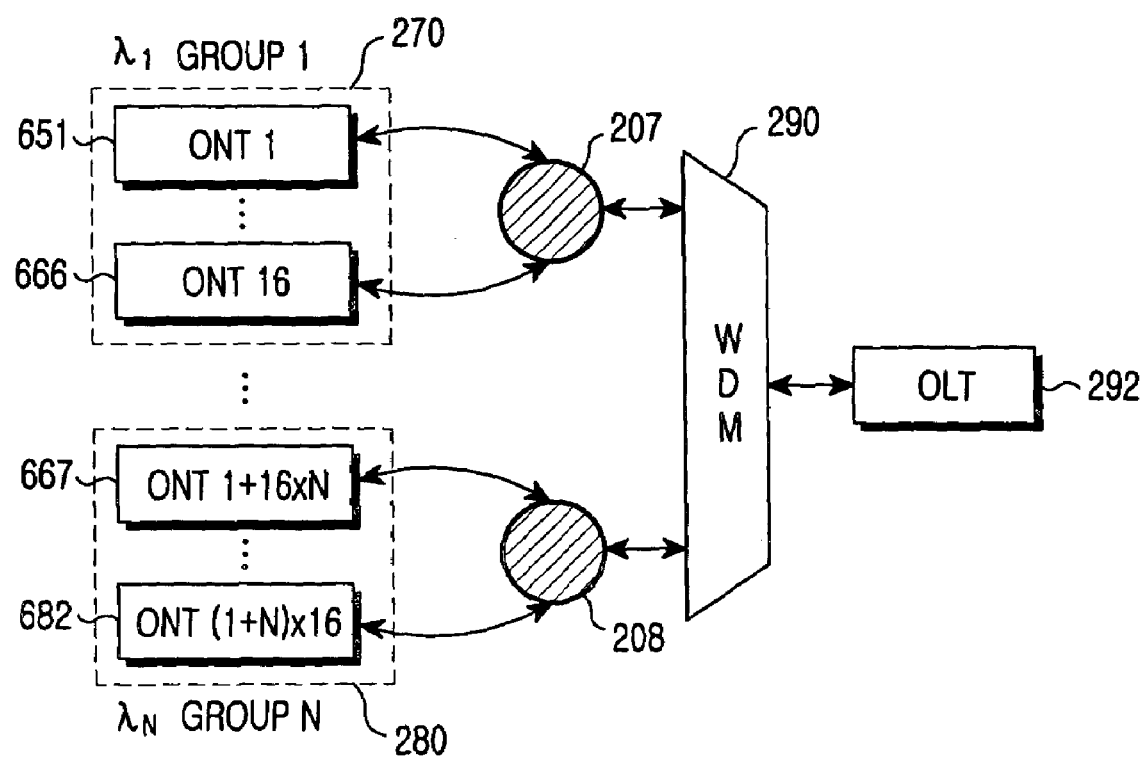
FIG. 11 is a schematic view illustrating yet another aspect of the invention in which the CDMA-employing PON method according to the present invention is applied to a WDM-PON.

FIG. 11 is a schematic view illustrating an aspect in which the CDMA-employing PON method according to the present invention is applied to a WDM-PON.

Figure 12:
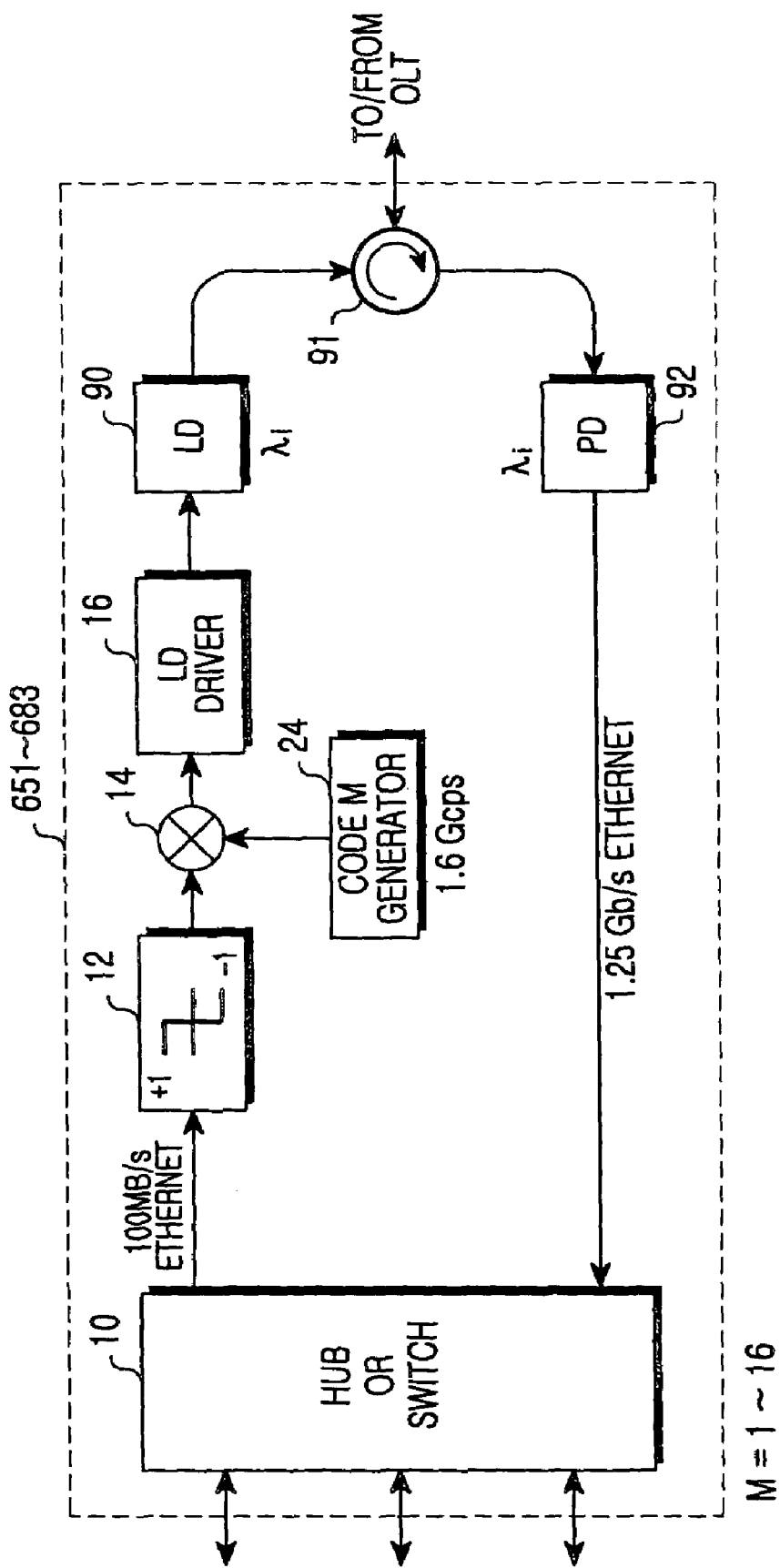
FIG. 12 is a schematic view illustrating a construction of an ONT in the WDM-PON shown in FIG. 11.
Figure 13:
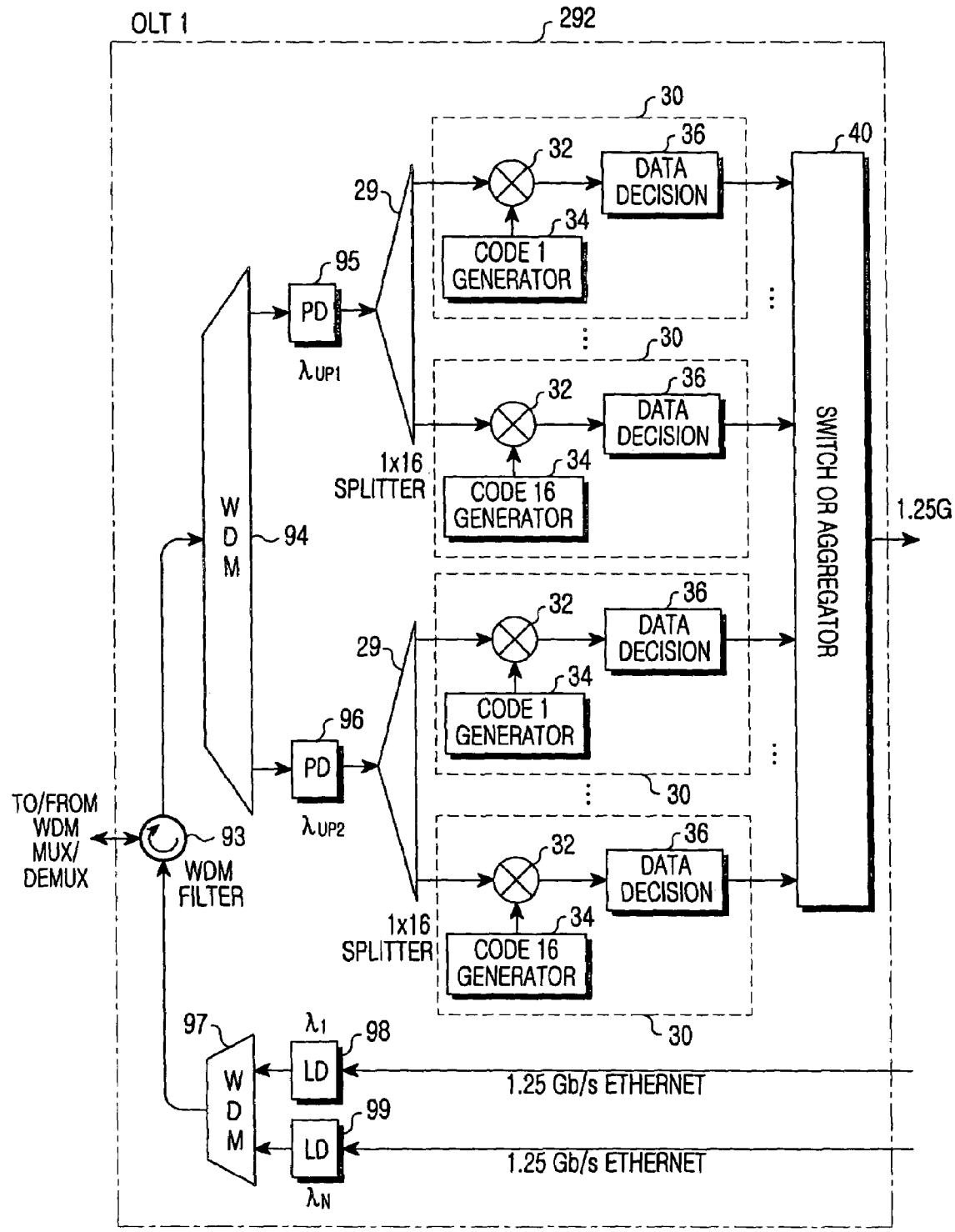
FIG. 13 is a schematic view illustrating a construction of an OLT in the WDM-PON shown in FIG. 11.

FIG. 12 is a schematic view illustrating a construction of an ONT of the WDM-PON shown in FIG. 11, and FIG. 13 is a schematic view illustrating a construction of an OLT of the WDM-PON shown in FIG. 11.

Referring to FIGS. 11 to 13, a WDM-PON comprises a plurality of ONT groups 270 to 280, an OLT 292, a wavelength multiplexing/demultiplexing device 290 and a plurality of optical couplers 207 and 208, while each ONT group consists of sixteen ONTs 651 to 666 or 667 to 682. In this aspect, each ONT includes an optical transmitter 90 and an optical receiver 92 for transmitting and receiving data at an assigned wavelength, and also includes an optical circulator 91 in the case of using the same wavelength for transmission and receipt. The OLT 292 includes a optical circulator 93, a wavelength multiplexer 97, a demultiplexer 94, optical receivers 95 and 96 for receiving each wavelength and optical transmitters 98 and 99 for transmitting each wavelength.

optical circulator 93, are divided according to wavelengths in the wavelength multiplexing/demultiplexing device 290, and then are transmitted to ONTs in each group through the optical couplers 207 and 208.

Table 1 is a Walsh code table having sixteen chips assigned to sixteen subscribers as a sequence when the Walsh Hadamard codes are used as CDMA codes. Each code has a perfectly orthogonal characteristic.

TABLE 1

| Walsh code | Chip order | | | | | | | | | | | | | | | |
|---|---|---|---|---|---|---|---|---|---|---|---|---|---|---|---|---|
| | c0 | c1 | c2 | c3 | c4 | c5 | c6 | c7 | c8 | c9 | c10 | c11 | c12 | c13 | c14 | c15 |
| Code 1 | 1 | 1 | 1 | 1 | 1 | 1 | 1 | 1 | 1 | 1 | 1 | 1 | 1 | 1 | 1 | 1 |
| Code 2 | 1 | −1 | 1 | −1 | 1 | −1 | 1 | −1 | 1 | −1 | 1 | −1 | 1 | −1 | 1 | −1 |
| Code 3 | 1 | 1 | −1 | −1 | 1 | 1 | −1 | −1 | 1 | 1 | −1 | −1 | 1 | 1 | −1 | −1 |
| Code 4 | 1 | −1 | −1 | 1 | 1 | −1 | −1 | 1 | 1 | −1 | −1 | 1 | 1 | −1 | −1 | 1 |
| Code 5 | 1 | 1 | 1 | 1 | −1 | −1 | −1 | −1 | 1 | 1 | 1 | 1 | −1 | −1 | −1 | −1 |
| Code 6 | 1 | −1 | 1 | −1 | −1 | 1 | −1 | 1 | 1 | −1 | 1 | −1 | −1 | 1 | −1 | 1 |
| Code 7 | 1 | 1 | −1 | −1 | −1 | −1 | 1 | 1 | 1 | 1 | −1 | −1 | −1 | −1 | 1 | 1 |
| Code 8 | 1 | −1 | −1 | 1 | −1 | 1 | 1 | −1 | 1 | −1 | −1 | 1 | −1 | 1 | 1 | −1 |
| Code 9 | 1 | 1 | 1 | 1 | 1 | 1 | 1 | 1 | −1 | −1 | −1 | −1 | −1 | −1 | −1 | −1 |
| Code 10 | 1 | −1 | 1 | −1 | 1 | −1 | 1 | −1 | −1 | 1 | −1 | 1 | −1 | 1 | −1 | 1 |
| Code 11 | 1 | 1 | −1 | −1 | 1 | 1 | −1 | −1 | −1 | −1 | 1 | 1 | −1 | −1 | 1 | 1 |
| Code 12 | 1 | −1 | −1 | 1 | 1 | −1 | −1 | 1 | −1 | 1 | 1 | −1 | −1 | 1 | 1 | −1 |
| Code 13 | 1 | 1 | 1 | 1 | −1 | −1 | −1 | −1 | −1 | −1 | −1 | −1 | 1 | 1 | 1 | 1 |
| Code 14 | 1 | −1 | 1 | −1 | −1 | 1 | −1 | 1 | −1 | 1 | −1 | 1 | 1 | −1 | 1 | −1 |
| Code 15 | 1 | 1 | −1 | −1 | −1 | −1 | 1 | 1 | −1 | −1 | 1 | 1 | 1 | 1 | −1 | −1 |
| Code 16 | 1 | −1 | −1 | 1 | −1 | 1 | 1 | −1 | −1 | 1 | 1 | −1 | 1 | −1 | −1 | 1 |

Figure 14:
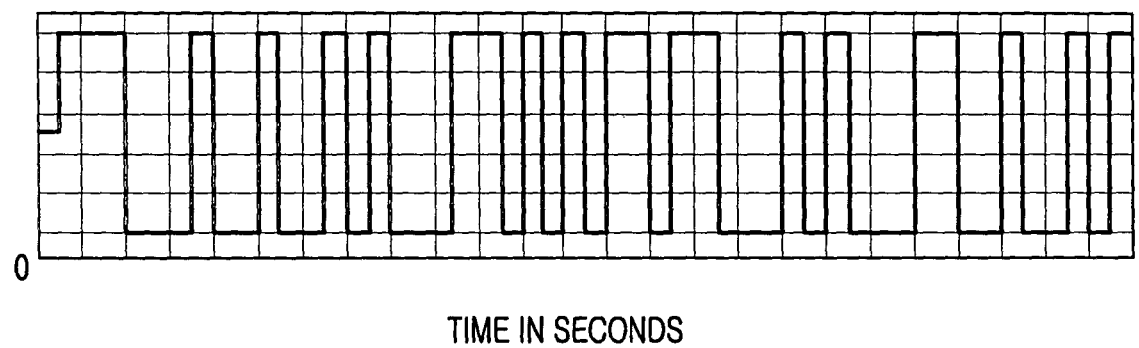
FIG. 14 is a view illustrating waveform of input signals in a simulation for verifying the operation of a CDMA-employing PON according to the present invention.
Figure 15:
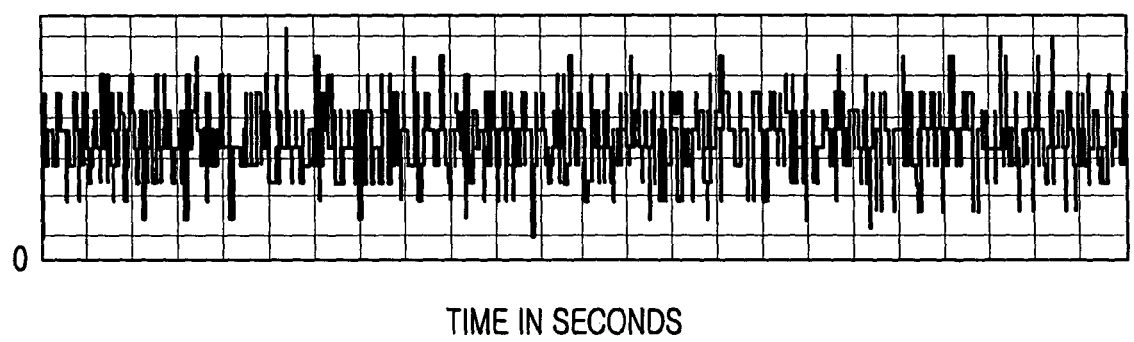
FIG. 15 is a view illustrating waveform of upstream signals outputted from an optical coupler in a simulation for verifying the operation of a CDMA-employing PON according to the present invention.

In the third aspect, the ONTs forms n number of groups 270 to 280 comprising sixteen ONTs respectively. Then, each group uses different wavelengths form each other according to groups. That is, a first group uses a first wavelength $\lambda_1$, a second group uses a second wavelength $\lambda_2$, and a $n^{th}$ group uses a $n^{th}$ wavelength $\lambda$. Therefore, each ONT includes the optical transmitter 90 and the optical receiver 92 for transmitting and receiving data at an assigned wavelength, and also includes an optical circulator 91 in the case that transmitting and receiving wavelengths is the same. In a case that the transmitting and receiving wavelengths are different from each other as an other aspect, the optical circulator 91 may be replaced by a WDM(Wave Division Multiplex) filter or an optical coupler. The sixteen ONTs 651 to 666 and 667 to 682 in each group are distinguished by means of 16-chip-sequence CDMA codes, likewise to the previous aspects described above. Signals, which are optical-modulated in each of sixteen ONTs 651 to 666 or 667 to 682 in each group, are coupled in the 1×16 optical couplers 207 and 208, are multiplexed through the wavelength multiplexing/demultiplexing device 290, and then are transmitted into the OLT 292. Optical signals, which have transmitted upstream from the optical circulator 93 in an input section of the OLT 292, are transmitted to the demultiplexer 94 so as to be divided according to wavelengths, are converted into electric signals by the optical receivers 95 and 96, and then are encoded to original data by the same CDMA receivers as those shown in FIG. 2. 1.25 Gbps Ethernet downstream signals are optical-modulated in the optical transmitters 98 and 99 having wavelengths assigned differentially according to groups, are multiplexed in the wavelength multiplexer 97, and then are transmitted downstream through the optical circulator 93. The optical circulator 93, like that in the ONTs 651 to 682, may be replaced by an optical coupler or an WDM filter. These signals, which are transmitted downstream through the FIG. 14 shows the waveform of output signals (input data) of a level transformer in an ONT in a simulation for verifying the operation of a CDMA-employing PON, and FIG. 15 shows waveform of output signals of a 1×16 optical coupler connecting upstream signals transmitted from sixteen ONTs in a simulation for verifying the operation of a CDMA-employing PON.

Figure 16:
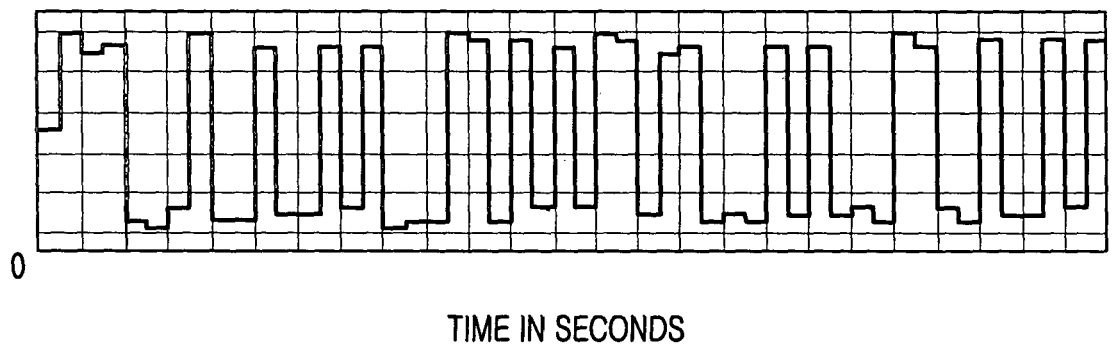
FIG. 16 is a view illustrating a waveform resulting from correlation calculation of a CDMA receiver in an OLT in a simulation for verifying the operation of the CDMA-employing PON according to the present invention.

FIG. 16 shows waveform of correlation signals of a first CDMA receiver in an OLT in a simulation for verifying the operation of a CDMA-employing PON, the correlation signals representing correlation-output signals of received signals and CDMA code-1.

Figure 17:
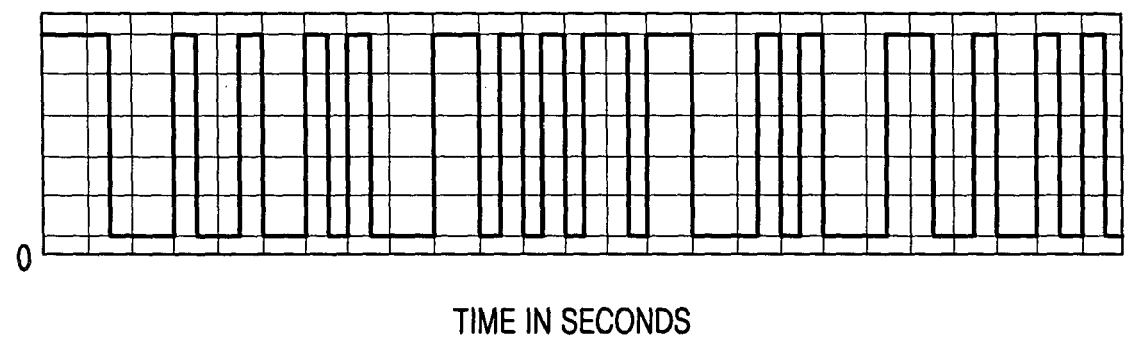
FIG. 17 is a view illustrating waveform of decoded output data in a simulation for verifying the operation of the CDMA-employing PON according to the present invention.

FIG. 17 shows waveform of output signals encoded, that is, output data encoded, by a first CDMA receiver in an OLT in a simulation for verifying the operation of the CDMA-employing PON.

As described above, the PON for providing a large quantity of data at a high speed to subscribers according to the present invention, unlike the ATM-PON and Ethernet PON according to the prior art, doesn't need the use of the complicated MAC protocol by adopting the CDMA method instead of the TDMA method as an upstream data transmission method, while the complicated MAC protocol has been necessarily used in the prior art. Therefore, the PON according to the present invention enables the ONTs to maintain a state capable of transmitting data at all times, thereby guaranteeing a wide bandwidth of 100 Mbps at all times, unlike the prior art. Also, the PON according to the present invention can use the optical transmitter and receiver utilized commercially without a BMIC (Burst Mode IC), though the BMIC has been necessarily required for optical receivers of OLTs and optical transmitters of ONTs in the ATM-PON and the Ethernet PON according to the prior art. Also, the PON according to the present invention adopts CDMA method for the upstream signals, and thus can easily encode the signals.

Accordingly, the construction of the CDMA-employing PON according to the present invention can henceforth be efficiently applied to large-scale optical subscriber networks, also can be excellently applied to WDM-PONs generally recognized as a ultimate structure for optical subscriber networks. Therefore, the construction of the CDMA-employing PON according to the present invention solves the problems of the ATM-PON and the Ethernet PON according to the prior art, and thus henceforth can be applied to large-scale optical subscriber networks in forms of FTTC/B or FTTH.

While the invention has been shown and described with reference to certain preferred aspects thereof, it will be understood by those skilled in the art that various changes in form and details may be made therein without departing from the spirit and scope of the invention as defined by the appended claims. For example, the upstream protocol and the downstream protocol could be some other form of transmission (although CDMA and TDMA are preferred) so long as complicated protocols such as MAC are not needed because of the reduction of the collision problem.

What is claimed is:

1. A PON (Passive Optical Network) employing CDMA (Code Division Multiple Access) only in upstream transmissions, said PON comprising:
   a plurality of ONTs (Optical Network Terminals) corresponding to subscribers;
   a plurality of WDM filters for dividing upstream wavelengths to the PON and downstream wavelengths to the subscribers;
   an OLT (Optical Line Terminal) for receiving optical signals transmitted from the ONTs and transmitting the received optical signals to a higher network, said OLT transmitting signals transmitted from the higher network into at least one of the plurality of ONTs; and
   an optical coupler, wherein:
   each ONT includes a first switching unit connected to at least one lower interface, a level transformer for converting Ethernet signals having levels of '0' and '1' into data signals of levels of '−1' and '+1', a first code generator for generating CDMA codes as specific codes so as to discriminate each ONT, and a first multiplier for performing spread spectrum function by multiplying the data signals by the CDMA codes so as to transmit Ethernet signals transmitted from the lower interfaces into the higher network; and
   wherein the OLT includes an optical receiver for receiving optical signals transmitted
   wherein the OLT includes an optical receiver for receiving optical signals transmitted from the ONTs, a branching filter for branching upstream CDMA signals received through the optical receiver, a plurality of second code generators for generating codes for despread, a plurality of second multipliers for multiplying received signals by the codes generated from the second code generators, and a plurality of data decider for extracting data through correlation calculation, so as to transmit Ethernet signals transmitted from higher interfaces into the higher network.

2. The PON (Passive Optical Network) employing CDMA (Code Division Multiple Access) as claimed in claim 1, wherein the first code generator of the ONT and the second code generator of the OLT are 1.6-Gcps code generators generating a 16-chip sequence to 100 Mbps Ethernet signals.

3. The PON according to claim 1, wherein said at least one lower interface comprises a computer.

4. The PON (Passive Optical Network) employing CDMA (Code Division Multiple Access) according to claim 2, wherein the first code generator of the ONT and the second code generator of the OLT use 16-chip Walsh Hadamard codes.

5. The PON (Passive Optical Network) employing CDMA (Code Division Multiple Access) according to claim 2, wherein the branching filter has a 1×16 structure comprising one input and sixteen outputs.

6. The PON (Passive Optical Network) employing CDMA (Code Division Multiple Access) a according to claim 1, wherein the first code generator of the ONT and the second code generator of the OLT are 3.2-Gcps code generators generating a 32-chip sequence to 100 Mbps Ethernet signals.

7. The PON (Passive Optical Network) employing CDMA (Code Division Multiple Access) according to claim 6, wherein the branching filter has a 1×32 structure comprising one input and 32 number of outputs.

8. A PON (Passive Optical Network) employing CDMA (Code Division Multiple Access) in upstream communications, said PON comprising:
   a plurality of ONTs (Optical Network Terminals) corresponding to subscribers which are divided into a plurality of groups;
   a plurality of WDM filters for dividing upstream and downstream wavelengths;
   an OLT (Optical Line Terminal) for receiving optical signals transmitted from the ONTs and transmitting the received optical signals to a higher network, the OLT transmitting signals transmitted from the higher network into ONTs; and
   an optical coupler, wherein:
   each ONT includes a first switching unit connected to at least one lower interface, a level transformer for converting Ethernet signals having levels of '0' and '1' into data signals of levels of '−1' and '+1', a first code generator for generating CDMA codes as specific codes so as to discriminate each ONT, a first multiplier for performing a first spread spectrum function by multiplying the data signals by the CDMA codes, a first PN code generator for generating PN codes so as to discriminate its own group from all the other groups, and a second multiplier for performing a second spread spectrum function by multiplying the data outputted from the first multiplier by the PN codes, whereby transmitting Ethernet signals transmitted from the lower interfaces into the higher network; and
   wherein said OLT includes an optical receiver for receiving optical signals transmitted from the ONTs, a branching filter for branching upstream CDMA signals received through the optical receiver, a plurality of second PN code generators for dividing signals according to groups, a plurality of third multipliers for multiplying the received signals by PN codes, a plurality of second code generators for generating codes for despread, a plurality of fourth multipliers for respectively multiplying signals outputted from the third multipliers by the codes generated from the second code generators, and a plurality of data deciders for extracting data through correlation calculation, whereby transmitting Ethernet signals transmitted from higher interfaces into higher networks.

9. A PON (Passive Optical Network) employing CDMA (Code Division Multiple Access) for upstream communications, said PON comprising:

a plurality of ONTs (Optical Network Terminals) corresponding to subscribers which are divided into a plurality of groups;
WDM filters for dividing upstream and downstream wavelengths;
an OLT (Optical Line Terminal) for receiving optical signals transmitted from the ONTs and transmitting the received optical signals to a higher network, the OLT transmitting signals transmitted from the higher network into ONTs; and
an optical coupler, wherein:
each ONT includes a first switching means connected to at least one lower interface, a level transformer for converting Ethernet signals having levels of '0' and '1' into data signals of levels of -'−1' and '+1', a first code generator for generating CDMA codes as specific codes so as to discriminate each ONT, a first multiplier for performing a first spread spectrum function by multiplying the data signals by the CDMA codes, and a laser diode having a wavelength for discriminating its own group from all the other groups, so as to transmit Ethernet signals transmitted from the lower interfaces into the higher network; and wherein the OLT includes an wavelength-demultiplexing filter for dividing optical signals transmitted from the ONTs according to wavelengths so as to discriminate the optical signals according to groups, a plurality of optical receivers for receiving optical signals divided according to wavelengths, a plurality of branching filters for branching upstream CDMA signals received through the optical receivers, a plurality of second code generators for generating codes for despread, a plurality of second multipliers for multiplying the received signals by the codes generated from the second code generators, and a plurality of data deciders for extracting data through correlation calculation, whereby transmitting Ethernet signals transmitted from higher interfaces into higher networks.

10. The PON (Passive Optical Network) employing CDMA (Code Division Multiple Access) as claimed in claim 9, wherein the upstream wavelengths and downstream wavelengths are the same, and the PON further comprises a plurality of optical circulators.

* * * * *